United States Patent
Guo et al.

(10) Patent No.: US 7,117,236 B2
(45) Date of Patent: *Oct. 3, 2006

(54) PARALLEL ADDER-BASED DCT/IDCT DESIGN USING CYCLIC CONVOLUTION

(75) Inventors: Jiun-In Guo, Miao-Li (TW); Kun-Wang Liu, Hsinchu (TW)

(73) Assignee: Macronix International Co. Ltd, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/897,486

(22) Filed: Jul. 23, 2004

(65) Prior Publication Data

US 2005/0004963 A1 Jan. 6, 2005

Related U.S. Application Data (62) Division of application No. 09/452,655, filed on Dec. 1, 1999, now Pat. No. 6,871,208.

(51) Int. Cl.
*G06F 7/14* (2006.01)

(52) U.S. Cl. ...................... 708/401; 708/402
(58) Field of Classification Search ......... 708/401–402
See application file for complete search history.

(56) References Cited

U.S. PATENT DOCUMENTS

| | | | |
|---|---|---|---|
| 3,878,985 A | 4/1975 | Ghest et al. |
| 4,156,920 A | 5/1979 | Winograd |
| 4,646,256 A | 2/1987 | Bracewell |
| 4,797,847 A | 1/1989 | Duhamel |
| 5,231,601 A | 7/1993 | Stearns |
| 5,677,863 A | 10/1997 | Naffziger |
| 5,805,482 A | 9/1998 | Phillips |
| 5,859,788 A | 1/1999 | Hou |
| 5,867,414 A | 2/1999 | Kao |
| 5,867,601 A | 2/1999 | Phillips |
| 5,889,690 A | 3/1999 | Arakawa |
| 5,889,692 A | 3/1999 | Wolrich et al. |

(Continued)

OTHER PUBLICATIONS

David Akopian et al., "Pipeline Processor for Fast Architecture Oriented Regular DCT-IDCT Algorithm," Signal Processing Laboratory, Tampere University of Technology, Finland, pp. 1319-1322.

(Continued)

*Primary Examiner*—Tan V. Mai
(74) *Attorney, Agent, or Firm*—Ernest J. Beffel, Jr.; Haynes Beffel & Wolfeld LLP (57) ABSTRACT

The present invention provides a device and method for applying 1-D and 2-D DCT and IDCT transforms to sets of input data, typically 8×8 or 16×16 matricies of coefficients. In one embodiment, the present invention provides input lines, logic to pre-add input values and generate operands and one or more adder networks that effectively carry out the multiplication operations required to apply a DCT/IDCT transform. The device may apply a 1-D transform twice to accomplish a 2-D transform. Alternatively, the present invention may either include successive stages of logic for the second 1-D transform or it may send data transformed once back through the same logic to pre-add and adder networks for the second 1-D transform. Calculations may be carried out after Booth encoding of operands. The processing may be split between producing $v_p$, a vector of sums of output values, and producing $v_n$, a vector of differences of output values, which vectors may be recombined to produce an output vector v.

10 Claims, 7 Drawing Sheets

U.S. PATENT DOCUMENTS 5,892,698 A     4/1999    Naffziger
6,223,195 B1    4/2001    Tonomura

OTHER PUBLICATIONS

"Compression Technology: an MPEG Overview," downloaded from: http://www.c-cube.com/technology/mpeg.html pp. 1-11.

"The Implementation of the 2D-IDCT", downloaded from: http://rnvs.infomatik.tu-chemnitz.de/~ja/MPEG/HTML/IDCT.html pp. 1-12.

Romesh M. Jessani et al., "Comparison of Single- and Dual-Pass Multiply-Add Fused Floating-Point Units," IEEE Transactions on Computers, vol. 47, No. 9, Sep. 1999, pp. 927-937.

Yutai Ma, "A Simplified Architecture for Module (2n+1) Multiplication," IEEE Transactions on Computers, vol. 47, No. 3, Mar. 1998, pp. 333-337.

Vojin G. Oklobdzija et al., "A Method for Speed Optimized Partial Product Reduction and Generation of Fast Parallel Multipliers Using an Algorithmic Approach," IEEE Transactions on Computers, vol. 45, No. 3, Mar. 1996, pp. 294-306.

Ioannis Pitas et al, "Multidimensional Cyclic Convolution Algorithms with Minimal Multiplicative Complexity," IEEE Transactions on Acoustics, Speech and Signal Processing, vol. ASSP-35, No. 3, Mar. 1987, pp. 384-390.

Jacques Prado et al., "A Polynomial-Transform Based Computation of the 2-D DCT with Minimum Mulitplicative Complexity," Telecom-Paris Department Signal, France, pp. 1-5.

K. R. Rao et al, Discrete Cosine Transform, Academic Press, Inc., Harcourt Brace Jovanovich, pp. 110-114.

Ross Smith et al., "An Asynchronous 2-D Discrete Cosine Transform Chip," Theseus Logic, Inc., St. Paul, Minnesota, USA, pp. 1-10.

Marvi Teixeira et al., "A Class of Fast Cyclic Convolution Algorithms Based on Block Pseudocirculants," IEEE Signal Processing Letters, vol. 2, No. 5, May 1995, pp. 92-94.

Roger Woods et al., "Applying an XC6200 to Real-Time Image Processing," IEEE Design & Test of Computers, Jan.-Mar. 1998, pp. 30-38.

Fig. 1

$$vp0 = \begin{bmatrix} 0 \\ 1 \\ 0 \end{bmatrix} \cdot \begin{bmatrix} d0+d2 \\ d1 \\ d3 \end{bmatrix} \cdot 2^0 + \begin{bmatrix} 1 \\ 0 \\ 1 \end{bmatrix} \cdot \begin{bmatrix} d0+d2 \\ d1 \\ d3 \end{bmatrix} \cdot 2^{-1} + \begin{bmatrix} 0 \\ 0 \\ 0 \end{bmatrix} \cdot \begin{bmatrix} d0+d2 \\ d1 \\ d3 \end{bmatrix} \cdot 2^{-2}$$

$$+ \begin{bmatrix} 1 \\ 0 \\ \bar{1} \end{bmatrix} \cdot \begin{bmatrix} d0+d2 \\ d1 \\ d3 \end{bmatrix} \cdot 2^{-3} + \begin{bmatrix} 1 \\ \bar{1} \\ 0 \end{bmatrix} \cdot \begin{bmatrix} d0+d2 \\ d1 \\ d3 \end{bmatrix} \cdot 2^{-4} + \begin{bmatrix} 0 \\ 0 \\ 0 \end{bmatrix} \cdot \begin{bmatrix} d0+d2 \\ d1 \\ d3 \end{bmatrix} \cdot 2^{-5}$$

$$+ \begin{bmatrix} 1 \\ \bar{1} \\ 0 \end{bmatrix} \cdot \begin{bmatrix} d0+d2 \\ d1 \\ d3 \end{bmatrix} \cdot 2^{-6} + \begin{bmatrix} 0 \\ 0 \\ 1 \end{bmatrix} \cdot \begin{bmatrix} d0+d2 \\ d1 \\ d3 \end{bmatrix} \cdot 2^{-7} + \begin{bmatrix} 1 \\ 0 \\ 0 \end{bmatrix} \cdot \begin{bmatrix} d0+d2 \\ d1 \\ d3 \end{bmatrix} \cdot 2^{-8}$$

(13)
$$+ \begin{bmatrix} 0 \\ 1 \\ 0 \end{bmatrix} \cdot \begin{bmatrix} d0+d2 \\ d1 \\ d3 \end{bmatrix} \cdot 2^{-9} + \begin{bmatrix} 0 \\ 0 \\ 0 \end{bmatrix} \cdot \begin{bmatrix} d0+d2 \\ d1 \\ d3 \end{bmatrix} \cdot 2^{-10} + \begin{bmatrix} 0 \\ 0 \\ 0 \end{bmatrix} \cdot \begin{bmatrix} d0+d2 \\ d1 \\ d3 \end{bmatrix} \cdot 2^{-11}$$

$$+ \begin{bmatrix} 0 \\ 0 \\ 0 \end{bmatrix} \cdot \begin{bmatrix} d0+d2 \\ d1 \\ d3 \end{bmatrix} \cdot 2^{-12} + \begin{bmatrix} 0 \\ 0 \\ \bar{1} \end{bmatrix} \cdot \begin{bmatrix} d0+d2 \\ d1 \\ d3 \end{bmatrix} \cdot 2^{-13} + \begin{bmatrix} 1 \\ 0 \\ 0 \end{bmatrix} \cdot \begin{bmatrix} d0+d2 \\ d1 \\ d3 \end{bmatrix} \cdot 2^{-14}$$

$$+ \begin{bmatrix} 0 \\ 1 \\ 0 \end{bmatrix} \cdot \begin{bmatrix} d0+d2 \\ d1 \\ d3 \end{bmatrix} \cdot 2^{-15} + \begin{bmatrix} 1 \\ 1 \\ 0 \end{bmatrix} \cdot \begin{bmatrix} d0+d2 \\ d1 \\ d3 \end{bmatrix} \cdot 2^{-16}$$

Fig. 2A (13 cont.) where $\begin{bmatrix} d0 \\ d1 \\ d2 \\ d3 \end{bmatrix} = \left( \begin{bmatrix} u0 \\ u2 \\ u4 \\ u6 \end{bmatrix} \text{for vp0}, \begin{bmatrix} u0 \\ -u6 \\ -u4 \\ u2 \end{bmatrix} \text{for vp1}, \begin{bmatrix} u0 \\ u6 \\ -u4 \\ -u2 \end{bmatrix} \text{for vp2}, \begin{bmatrix} u0 \\ -u2 \\ u4 \\ -u6 \end{bmatrix} \text{for vp3} \right)$

Fig. 2B $$vn2 = \begin{bmatrix} 1 \\ 1 \\ 0 \\ 0 \end{bmatrix} \cdot \begin{bmatrix} d0 \\ d1 \\ d2 \\ d3 \end{bmatrix} \cdot 2^0 + \begin{bmatrix} 0 \\ 0 \\ 0 \\ 1 \end{bmatrix} \cdot \begin{bmatrix} d0 \\ d1 \\ d2 \\ d3 \end{bmatrix} \cdot 2^{-1} + \begin{bmatrix} 0 \\ \bar{1} \\ 1 \\ 0 \end{bmatrix} \cdot \begin{bmatrix} d0 \\ d1 \\ d2 \\ d3 \end{bmatrix} \cdot 2^{-2} + \begin{bmatrix} 0 \\ 0 \\ 0 \\ 0 \end{bmatrix} \cdot \begin{bmatrix} d0 \\ d1 \\ d2 \\ d3 \end{bmatrix} \cdot 2^{-3}$$

$$+ \begin{bmatrix} 0 \\ 1 \\ \bar{1} \\ 1 \end{bmatrix} \cdot \begin{bmatrix} d0 \\ d1 \\ d2 \\ d3 \end{bmatrix} \cdot 2^{-4} + \begin{bmatrix} 0 \\ 0 \\ 0 \\ 0 \end{bmatrix} \cdot \begin{bmatrix} d0 \\ d1 \\ d2 \\ d3 \end{bmatrix} \cdot 2^{-5} + \begin{bmatrix} \bar{1} \\ 1 \\ 0 \\ 0 \end{bmatrix} \cdot \begin{bmatrix} d0 \\ d1 \\ d2 \\ d3 \end{bmatrix} \cdot 2^{-6} + \begin{bmatrix} 0 \\ 0 \\ 1 \\ \bar{1} \end{bmatrix} \cdot \begin{bmatrix} d0 \\ d1 \\ d2 \\ d3 \end{bmatrix} \cdot 2^{-7}$$

$$(15) \quad + \begin{bmatrix} \bar{1} \\ 1 \\ 0 \\ 0 \end{bmatrix} \cdot \begin{bmatrix} d0 \\ d1 \\ d2 \\ d3 \end{bmatrix} \cdot 2^{-8} + \begin{bmatrix} 0 \\ 0 \\ 0 \\ 0 \end{bmatrix} \cdot \begin{bmatrix} d0 \\ d1 \\ d2 \\ d3 \end{bmatrix} \cdot 2^{-9} + \begin{bmatrix} 0 \\ 0 \\ 0 \\ 1 \end{bmatrix} \cdot \begin{bmatrix} d0 \\ d1 \\ d2 \\ d3 \end{bmatrix} \cdot 2^{-10} + \begin{bmatrix} 0 \\ \bar{1} \\ 0 \\ 0 \end{bmatrix} \cdot \begin{bmatrix} d0 \\ d1 \\ d2 \\ d3 \end{bmatrix} \cdot 2^{-11}$$

$$+ \begin{bmatrix} 1 \\ 0 \\ \bar{1} \\ 0 \end{bmatrix} \cdot \begin{bmatrix} d0 \\ d1 \\ d2 \\ d3 \end{bmatrix} \cdot 2^{-12} + \begin{bmatrix} 0 \\ 0 \\ 0 \\ \bar{1} \end{bmatrix} \cdot \begin{bmatrix} d0 \\ d1 \\ d2 \\ d3 \end{bmatrix} \cdot 2^{-13} + \begin{bmatrix} 1 \\ \bar{1} \\ 0 \\ 0 \end{bmatrix} \cdot \begin{bmatrix} d0 \\ d1 \\ d2 \\ d3 \end{bmatrix} \cdot 2^{-14} + \begin{bmatrix} 0 \\ 0 \\ 0 \\ 1 \end{bmatrix} \cdot \begin{bmatrix} d0 \\ d1 \\ d2 \\ d3 \end{bmatrix} \cdot 2^{-15}$$

$$+ \begin{bmatrix} 1 \\ \bar{1} \\ 1 \\ 0 \end{bmatrix} \cdot \begin{bmatrix} d0 \\ d1 \\ d2 \\ d3 \end{bmatrix} \cdot 2^{-16}$$

Fig. 3A (15 cont.) where $\begin{bmatrix} d0 \\ d1 \\ d2 \\ d3 \end{bmatrix} = \left( \begin{bmatrix} u1 \\ u3 \\ u7 \\ u5 \end{bmatrix} \text{ for } vn0 \right.$ $\begin{bmatrix} -u5 \\ u1 \\ -u3 \\ -u7 \end{bmatrix} \text{ for } vn1$ $\begin{bmatrix} -u3 \\ u7 \\ u5 \\ u1 \end{bmatrix} \text{ for } vn2$ $\left. \begin{bmatrix} -u7 \\ u5 \\ u1 \\ -u3 \end{bmatrix} \text{ for } vn3 \right)$

Fig. 3B (16)
$$vn2 = (d0 + d1) \cdot 2^0 + d3 \cdot 2^{-1} + (d2 - d1) \cdot 2^{-2} + [d3 - (d2 - d1)] \cdot 2^{-4}$$
$$+ (d1 - d0) \cdot 2^{-6} + (d2 - d3) \cdot 2^{-7} + (d1 - d0) \cdot 2^{-8} + d3 \cdot 2^{-10}$$
$$+ (-d1) \cdot 2^{-11} + (d0 - d2) \cdot 2^{-12} + (-d3) \cdot 2^{-13} + [-(d1 - d0)] \cdot 2^{-14}$$
$$+ d3 \cdot 2^{-15} + [d0 + (d2 - d1)] \cdot 2^{-16}$$

Fig. 5

PARALLEL ADDER-BASED DCT/IDCT DESIGN USING CYCLIC CONVOLUTION

RELATED APPLICATIONS

This application is a division of U.S. patent application Ser. No. 09/452,655, filed Dec. 1, 1999, entitled "Parallel Adder-Based DCT/IDCT Design Using Cyclic Convolution," now U.S. Pat. No. 6,871,208.

BACKGROUND OF THE INVENTION

1. Field of the Invention

This invention relates to the calculation of discrete cosine transforms and inverse discrete cosine transforms, which are useful in signal processing. In particular, the invention relates to using an adder network for speedy calculations and economical hardware design.

2. Description of Related Art

The discrete cosine transform (DCT) is important to digital signal processing, as standards for compression of both still and video images incorporate the DCT transform and speech coding sometimes also relies on the DCT transform. Products that rely on DCT and the reciprocal inverse discrete cosine transform (IDCT) may include high definition TV (HDTV), video conferencing, digital cameras and voice compression and recognition systems. The Joint Photographic Expert Group adopted a standard for compression of still images in 1992, known as JPEG. The Moving Picture Experts Group (MPEG) of the International Organization for Standardization (ISO) has adopted or published for comment a series of standards for video compression (e.g., MPEG-2, MPEG-4, etc.) In the United States and elsewhere, standards have emerged for high definition TV (HDTV). Common to these standards is use of DCT/IDCT for data compression scheme. As DCT also is used for speech coding, its application is not limited to image data.

Several favorable mathematical properties of DCT have led to its adoption for data compression and analysis. It is real, separable, orthogonal, and approximates the statistically optimal Karhunen-Loeve transform. When factored, the DCT transform matrix contains many zeros: submaticies in the upper left and lower right quadrants of the matrix have real values and the upper right and lower left quadrants are zeros.

$$\left( \text{E.g.,} \begin{bmatrix} Ce. & 0 \\ 0 & Co \end{bmatrix} \right)$$

The separability property allows a two dimensional DCT to be calculated by repeated application of a one dimensional transform. For data compression, when output values are quantized and zig-zag or otherwise reordered, run length encoding or other data compression schemes can productively be applied.

Rao & Yip explain in their book *Discrete Cosine Transform Algorithms, Advantages, Application* (Academic Press 1990), the DCT transform was not discovered until 1974. The evolution of DCT chips only began in 1984. A substantial amount of effort has been devoted to implementing DCT in hardware. Much work has been devoted to distributed arithmetic implementations. Rao & Yip describe several distributed arithmetic devices in section 5.6 of their book. The U.S. Pat. No. 5,805,482 issued to Larry Phillips is for an improved distributed arithmetic device. An article by Roger Woods, David Trainor & Jean-Paul Heron, *Applying an XC6200 to Real-Time Image Processing*, IEEE Design & Test of Computers, p. 30 (Jan.–March 1998) also applies distributed arithmetic to 2-D DCT transforms.

An adder network is an alternative to distributed arithmetic which exploits the cyclic convolution property of the DCT/IDCT transform. Speed and economical hardware implementation are advantages of an adder network.

SUMMARY OF THE INVENTION

The present invention provides a device and method for applying 1-D and 2-D DCT and IDCT transforms to sets of input data.

In one embodiment, the present invention provides input lines, logic to pre-add input values to generate operands and one or more adder networks that effectively carry out the multiplication operations required to apply a DCT/IDCT transform. The adder networks may include carry save adders and an additional adder to produce a final sum. The additional adder may be a carry propagate adder. In one embodiment, input data sets may consist of eight input data values. In another embodiment, a set may consist of 16 data values. Successive sets of data may comprise an 8×8 or 16×16 matrix. The device may apply a 1-D transform twice to accomplish a 2-D transform. Alternatively, the present invention may either include successive stages of logic for the second 1-D transform or it may send data transformed once back through the same logic to pre-add and adder networks for the second 1-D transform. In either case, logic to transform a data matrix prepares the output of the first 1-D transform to be input to the second transform. Calculations may be carried out by Booth encoding of operands. The processing may be split between producing $v_p$, a vector of sums of output values, and producing $v_n$, a vector of differences of output values, which vectors may be recombined to produce an output vector v. Similar devices and methods apply to DCT and IDCT transformation.

Integrally a part of the logic to pre-add and to present data one set at a time, the present invention further includes permutation devices, accepting as an input a set such as $u_0, u_2, u_4$ and $u_6$ and producing successive outputs sets such as ($u_0, u_2, u_4, u_6$), ($u_0, u_6, -u_4, -u_2$), ($u_0, -u_2, u_4, -u_6$), and ($u_0, -u_6, -u_4, u_2$), comprising a set of muxes coupled to inputs $u_0, u_2, u_4$ and $u_6$, registers coupled to the output of said muxes and coupled to the inputs of said muxes to produce permutations, sometimes coupled directly and other times through additive inverse logic, and a control line coupled to the muxes, controlling section between inputs and register couplings.

SUMMARY OF THE FIGURES

FIGS. 2A & B are a Booth encoded formula suitable for implementation in an adder network which illustrates the calculation of $v_p$, as in $$\begin{bmatrix} v_p \\ v_n \end{bmatrix} = \begin{bmatrix} C_e^T & 0 \\ 0 & C_o^T \end{bmatrix} \otimes \begin{bmatrix} u_e \\ u_o \end{bmatrix}.$$

FIGS. 3A, 3B & 3C, similar to FIGS. 2A & 2B, are a Booth encoded formula suitable for implementation in an adder network which illustrates the calculation of $v_n$.

DETAILED DESCRIPTION OF THE FIGURES

To help understand this novel adder-based design for realizing the cyclic convolution formulation of DCT/IDCT, it is useful to consider a simple cyclic convolution example:

$$U = \begin{bmatrix} u1 \\ u2 \\ u3 \end{bmatrix} = \begin{bmatrix} a & b & c \\ c & a & b \\ b & c & a \end{bmatrix} \cdot \begin{bmatrix} v1 \\ v2 \\ v3 \end{bmatrix} \quad (1)$$

Equation (1) can be rewritten as:

$$U = \begin{bmatrix} u1 \\ u2 \\ u3 \end{bmatrix} = \begin{bmatrix} v1 & v2 & v3 \\ v2 & v3 & v1 \\ v3 & v1 & v2 \end{bmatrix} \cdot \begin{bmatrix} a \\ b \\ c \end{bmatrix} \quad (2)$$

Equations (1) and (2) are both in cyclic convolution form, as the elements in successive rows of their coefficient matricies are the same. That is, some rows of each matrix are permutations of other rows. This property is helpful in reducing the hardware complexity of an adder network for a DCT/IDCT transform. To illustrate how the cyclic convolution property is helpful, let us assume that $$\begin{bmatrix} a \\ b \\ c \end{bmatrix} = \begin{bmatrix} 0.625 \\ 0.3125 \\ 0.125 \end{bmatrix} = \begin{bmatrix} 0.1010 \\ 0.0101 \\ 0.0010 \end{bmatrix} \quad (3)$$

From equations (2) and (3), we know that the output elements u1, u2, and u3 respectively can be written as $$u1 = 0.1010 \cdot v1 + 0.0101 \cdot v2 + 0.0010 \cdot v3 \quad (4)$$

$$= \begin{bmatrix} 1 \\ 0 \\ 0 \end{bmatrix} \cdot \begin{bmatrix} v1 \\ v2 \\ v3 \end{bmatrix} \cdot 2^{-1} + \begin{bmatrix} 0 \\ 1 \\ 0 \end{bmatrix} \cdot \begin{bmatrix} v1 \\ v2 \\ v3 \end{bmatrix} \cdot 2^{-2} +$$

$$\begin{bmatrix} 1 \\ 0 \\ 1 \end{bmatrix} \cdot \begin{bmatrix} v1 \\ v2 \\ v3 \end{bmatrix} \cdot 2^{-3} + \begin{bmatrix} 0 \\ 1 \\ 0 \end{bmatrix} \cdot \begin{bmatrix} v1 \\ v2 \\ v3 \end{bmatrix} \cdot 2^{-4}$$

$$= v1 \cdot 2^{-1} + v2 \cdot 2^{-2} + (v1 + v3) \cdot 2^{-3} + v2 \cdot 2^{-4}$$

$$u2 = 0.1010 \cdot v2 + 0.0101 \cdot v3 + 0.0010 \cdot v1$$
$$= v2 \cdot 2^{-1} + v3 \cdot 2^{-2} + (v2 + v1) \cdot 2^{-3} + v3 \cdot 2^{-4}$$

$$u3 = 0.1010 \cdot v3 + 0.0101 \cdot v1 + 0.0010 \cdot v2$$
$$= v3 \cdot 2^{-1} + v1 \cdot 2^{-2} + (v3 + v2) \cdot 2^{-3} + v1 \cdot 2^{-4}$$

Equations (4) can be implemented in a network of adders, including carry save adders, which quickly compute u1, u2, and u3. An adder network to implement the cyclic convolution U according to equations (4) is illustrated in FIG. 1.

Figure 1:
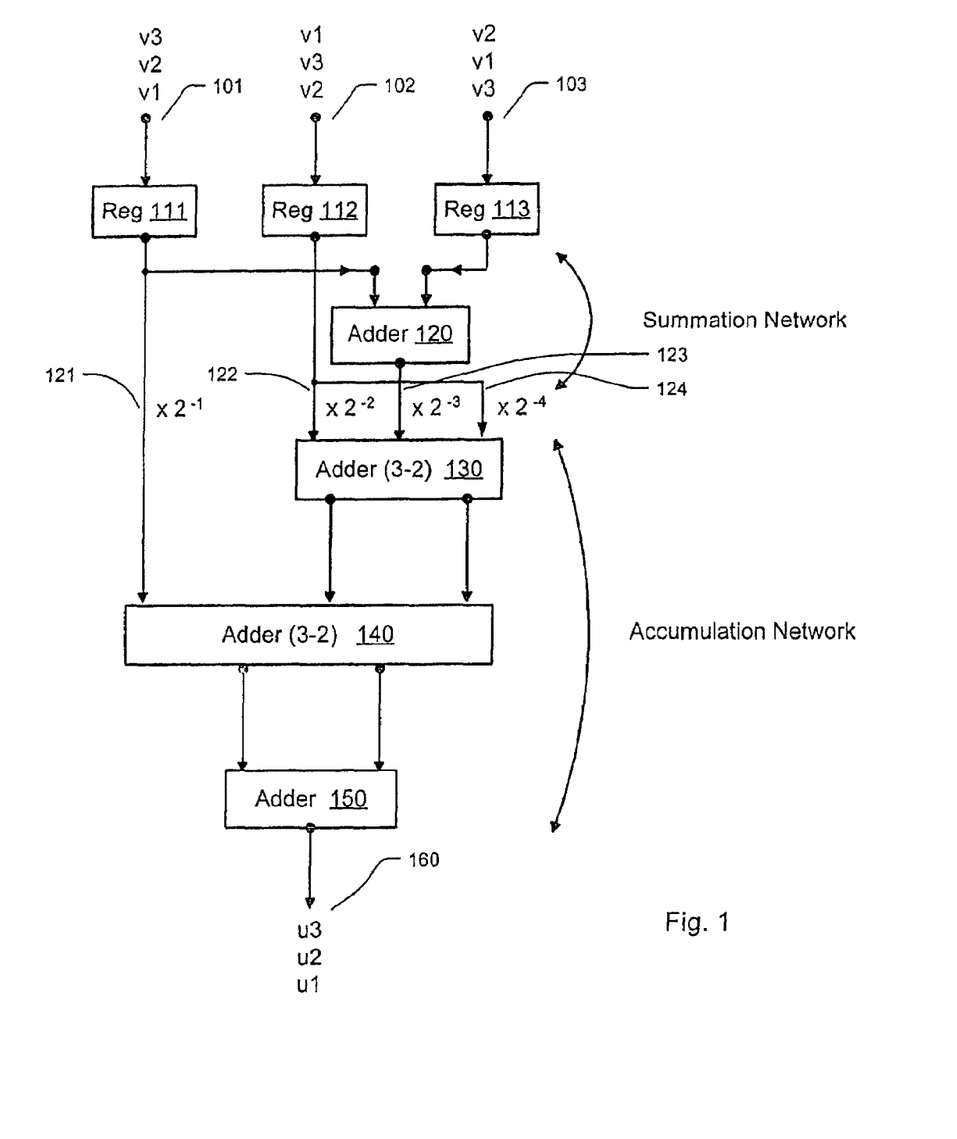
FIG. 1 illustrates an adder network to implement a sample cyclic convolution.

In FIG. 1, sets of input data values are introduced on input data lines 101, 102 and 103. Three sets of input data values constitute a 3×3 matrix of values. Sets of input data values are introduced to registers 111, 112 and 113 in three different orders, permuted to correspond to rows in the coefficient matrix of equation (1). Multiplication is accomplished by scaling inputs and accumulating them together in accordance with the coefficients derived in equation (4). The adders in the adder network include two or more type. Parallel bit adders, such as carry save adders 130 and 140, operate very quickly to produce intermediate sums with carry values. A carry propagate adder 150 combines outputs of the final carry save adder. One skilled in the art will appreciate that alternative types of adder can be used to combine the outputs of a carry save adder, as shown in Michael John Sebastian Smith, *Application-Specific Integrated Circuits*, pp. 77–86 (Addison Wesley 1997). This general illustration of implementing a cyclic convolution in an adder network emphasizes the potential advantage of having coefficients in a transform matrix that are cyclic.

The first illustration of applying this cyclic convolution approach to DCT/IDCT computation will be for the inverse discrete cosine transform. A DCT/IDCT transform matrix may be factored essentially as $$[u] = \begin{bmatrix} C_e & 0 \\ 0 & C_o \end{bmatrix} \otimes \begin{bmatrix} v_p \\ v_n \end{bmatrix},$$

where u is a set of output data values, $C_e$ is a coefficient sub-matrix for producing even indexed output data values, $C_o$ is a coefficient sub-matrix for producing odd indexed output data values, $v_p$ is a vector of sums of input data values for producing even indexed output data values, and $v_n$ is a vector of differences of input data values for producing odd indexed output data values. With this general form in mind, derivation of coefficients to be embodied in an adder network is given below for an 8×8 matrix of input data values. One of skill in the art will appreciate that the same approach applies to a 16×16 matrix of input data values.

To illustrate implementation of the IDCT in an adder network, we begin by reviewing the DCT transform. Using the symmetry property of the DCT coefficients, we can write the 1-D 8-point DCT as $$Ue = \begin{bmatrix} u0 \\ u2 \\ u4 \\ u6 \end{bmatrix} = \begin{bmatrix} \cos4\theta & \cos4\theta & \cos4\theta & \cos4\theta \\ \cos2\theta & \cos6\theta & \cos10\theta & \cos14\theta \\ \cos4\theta & \cos12\theta & \cos20\theta & \cos28\theta \\ \cos6\theta & \cos18\theta & \cos30\theta & \cos42\theta \end{bmatrix} \cdot \begin{bmatrix} vp0 \\ vp1 \\ vp2 \\ vp3 \end{bmatrix} = [Ce] \cdot [vp] \quad (5)$$

and $$Uo = \begin{bmatrix} u1 \\ u3 \\ u5 \\ u7 \end{bmatrix} = \begin{bmatrix} \cos1\theta & \cos3\theta & \cos5\theta & \cos7\theta \\ \cos3\theta & \cos9\theta & \cos15\theta & \cos21\theta \\ \cos5\theta & \cos15\theta & \cos25\theta & \cos35\theta \\ \cos7\theta & \cos21\theta & \cos35\theta & \cos49\theta \end{bmatrix} \cdot \begin{bmatrix} vn0 \\ vn1 \\ vn2 \\ vn4 \end{bmatrix} = [Co] \cdot [vn] \quad (6)$$

where $[vp] = \begin{bmatrix} vp0 \\ vp1 \\ vp2 \\ vp3 \end{bmatrix} = \begin{bmatrix} v0+v7 \\ v1+v6 \\ v2+v5 \\ v3+v4 \end{bmatrix}$ and $[vn] = \begin{bmatrix} vn0 \\ vn1 \\ vn2 \\ vn3 \end{bmatrix} = \begin{bmatrix} v0-v7 \\ v1-v6 \\ v2-v5 \\ v3-v4 \end{bmatrix}$;

$$[Ce] = \begin{bmatrix} \cos4\theta & \cos4\theta & \cos4\theta & \cos4\theta \\ \cos2\theta & \cos6\theta & \cos10\theta & \cos14\theta \\ \cos4\theta & \cos12\theta & \cos20\theta & \cos28\theta \\ \cos6\theta & \cos18\theta & \cos30\theta & \cos42\theta \end{bmatrix};$$

$$[Co] = \begin{bmatrix} \cos1\theta & \cos3\theta & \cos5\theta & \cos7\theta \\ \cos3\theta & \cos9\theta & \cos15\theta & \cos21\theta \\ \cos5\theta & \cos15\theta & \cos25\theta & \cos35\theta \\ \cos7\theta & \cos21\theta & \cos35\theta & \cos49\theta \end{bmatrix}; \text{ and } \theta = \pi/16.$$

Corresponding to this 1-D 8-point DCT, the inverse, IDCT can be written as $$[vp] = \begin{bmatrix} vp0 \\ vp1 \\ vp2 \\ vp3 \end{bmatrix} = \begin{bmatrix} v0+v7 \\ v1+v6 \\ v2+v6 \\ v3+v4 \end{bmatrix} = [Ce]^{-1} \cdot \begin{bmatrix} u0 \\ u2 \\ u4 \\ u6 \end{bmatrix} = [Ce]^T \cdot [Ue] \text{ and} \quad (7)$$

$$[vn] = \begin{bmatrix} vn0 \\ vn1 \\ vn2 \\ vn3 \end{bmatrix} = \begin{bmatrix} v0-v7 \\ v1-v6 \\ v2-v5 \\ v3-v4 \end{bmatrix} = [Co]^{-1} \cdot \begin{bmatrix} u1 \\ u3 \\ u5 \\ u7 \end{bmatrix} = [Co]^T \cdot [Uo] \quad (8)$$

With these equations in mind, we can derive coefficients suitable to be used in an adder network for computing an inverse discrete cosine transform. Those of skill in the art will understand that the factoring of matricies is not unique. Depending on the details of factoring a matrix, the coefficients may be as above or may vary, while in fact being essentially the same.

For a 1-D 8-point IDCT, we can permute input data and rewrite equations (7) and (8), respectively, as $$\begin{bmatrix} vp0 \\ vp1 \\ vp2 \\ vp3 \end{bmatrix} = \begin{bmatrix} \cos4\theta & \cos2\theta & \cos4\theta & \cos6\theta \\ \cos4\theta & \cos6\theta & \cos12\theta & \cos18\theta \\ \cos4\theta & \cos10\theta & \cos20\theta & \cos30\theta \\ \cos4\theta & \cos14\theta & \cos28\theta & \cos42\theta \end{bmatrix} \cdot \begin{bmatrix} u0 \\ u2 \\ u4 \\ u6 \end{bmatrix} =$$

$$\begin{bmatrix} \cos4\theta & \cos2\theta & \cos4\theta & \cos6\theta \\ \cos4\theta & \cos6\theta & -\cos4\theta & -\cos2\theta \\ \cos4\theta & -\cos6\theta & -\cos4\theta & \cos2\theta \\ \cos4\theta & -\cos2\theta & \cos4\theta & -\cos6\theta \end{bmatrix} \cdot \begin{bmatrix} u0 \\ u2 \\ u4 \\ u6 \end{bmatrix} \quad (9)$$

$$\begin{bmatrix} vp0 \\ vp3 \end{bmatrix} = \begin{bmatrix} \cos4\theta & \cos2\theta & \cos4\theta & \cos6\theta \\ \cos4\theta & -\cos2\theta & \cos4\theta & -\cos6\theta \end{bmatrix} \cdot \begin{bmatrix} u0 \\ u2 \\ u4 \\ u6 \end{bmatrix}$$

$$\begin{bmatrix} vp1 \\ vp2 \end{bmatrix} = \begin{bmatrix} \cos4\theta & -\cos2\theta & \cos4\theta & \cos6\theta \\ \cos4\theta & \cos2\theta & -\cos4\theta & -\cos6\theta \end{bmatrix} \cdot \begin{bmatrix} u0 \\ u6 \\ u4 \\ u2 \end{bmatrix}$$

$$[vp0 \ vp3 \ vp1 \ vp2] = [\cos4\theta \ \cos2\theta \ \cos4\theta \ \cos6\theta] \cdot \begin{bmatrix} u0 & u0 & u0 & u0 \\ u2 & -u2 & -u6 & u6 \\ u4 & u4 & -u4 & -u4 \\ u6 & -u6 & u2 & -u2 \end{bmatrix}$$

$$\begin{bmatrix} vn0 \\ vn1 \\ vn2 \\ vn3 \end{bmatrix} = \begin{bmatrix} \cos1\theta & \cos3\theta & \cos5\theta & \cos7\theta \\ \cos3\theta & \cos9\theta & \cos15\theta & \cos21\theta \\ \cos5\theta & \cos15\theta & \cos25\theta & \cos35\theta \\ \cos7\theta & \cos21\theta & \cos35\theta & \cos49\theta \end{bmatrix} \cdot \begin{bmatrix} u1 \\ u3 \\ u5 \\ u7 \end{bmatrix} =$$

$$\begin{bmatrix} \cos1\theta & \cos3\theta & \cos5\theta & \cos7\theta \\ \cos3\theta & -\cos7\theta & -\cos1\theta & -\cos5\theta \\ \cos5\theta & -\cos1\theta & \cos7\theta & \cos3\theta \\ \cos7\theta & -\cos5\theta & \cos3\theta & -\cos1\theta \end{bmatrix} \cdot \begin{bmatrix} u1 \\ u3 \\ u5 \\ u7 \end{bmatrix}$$

$$\begin{bmatrix} vn2 \\ vn0 \\ vn1 \\ vn3 \end{bmatrix} = \begin{bmatrix} -\cos1\theta & \cos3\theta & \cos7\theta & \cos5\theta \\ \cos3\theta & \cos7\theta & \cos5\theta & \cos1\theta \\ -\cos7\theta & -\cos5\theta & -\cos1\theta & \cos3\theta \\ -\cos5\theta & -\cos1\theta & \cos3\theta & \cos7\theta \end{bmatrix} \cdot \begin{bmatrix} u3 \\ u7 \\ u5 \\ u1 \end{bmatrix} \quad (10)$$

$$[vn2 \ vn0 \ vn1 \ vn3] = [\cos1\theta \ \cos3\theta \ \cos7\theta \ \cos5\theta] \cdot \begin{bmatrix} -u3 & u1 & -u5 & -u7 \\ u7 & u3 & u1 & u5 \\ u5 & u7 & -u3 & u1 \\ u1 & u5 & -u7 & -u3 \end{bmatrix}$$

From equations (9) and (10), we design one or more adder networks to calculate both vectors $v_p$ and $v_n$.

Modified Booth encoding of the coefficients processed by the adder network can further improve the speed of the present invention. Booth encoding is a family of techniques for changing the representation of a binary number so that fewer addition and accumulate steps will be required to accomplish a multiplication. An overview of encoding techniques that may suitably be used with the present invention appears in Smith, *Application Specific Integrated Circuits*, pp. 87–90. See also, A. D. Booth, *A Signed Binary Multiplication Technique*, A. J. Mech. Appl. Math., pp. 260–64 (April 1951); L. P. Rubinfield, *A Proof of the Modified Booth Algorithm for Multiplication*, IEEE Trans. on Computers, vol. C-24, pp. 1014–15 (October 1975); Romesh M. Jessani & Michael Putrino, *Comparison of Single-and Dual-Pass Multiply-Add Fused Floating-Point Units*, IEEE Trans. on Computers, vol. 47, pp. 927–37 (September 1998). Booth encoding may be applied to the IDCT coefficient submatricies factored above.

The IDCT coefficients of equations (9) and (10) can be written in their 16-bit binary form $$\begin{bmatrix} \cos4\theta \\ \cos2\theta \\ \cos6\theta \end{bmatrix} = \begin{bmatrix} 0.707106781 \\ 0.923879532 \\ 0.382683432 \end{bmatrix} = \begin{bmatrix} 0.1011 & 0101 & 0000 & 0101 \\ 0.1110 & 1100 & 1000 & 0011 \\ 0.0110 & 0001 & 1111 & 1000 \end{bmatrix} \text{ as}$$

$$\begin{bmatrix} \cos1\theta \\ \cos3\theta \\ \cos7\theta \\ \cos5\theta \end{bmatrix} = \begin{bmatrix} 0.98078528 \\ 0.831469612 \\ 0.195090322 \\ 0.555570233 \end{bmatrix} = \begin{bmatrix} 0.1111 & 1011 & 0001 & 0101 \\ 0.1101 & 0100 & 1101 & 1011 \\ 0.0011 & 0001 & 1111 & 0010 \\ 0.1000 & 1110 & 0011 & 1010 \end{bmatrix} \quad (11)$$

The coefficients in (11) often have several the consecutive binary "1"s. These consecutive "1"s require consecutive addition operations. In order to reduce the number of addition operations, the binary values can be recoded, using Booth encoding. Booth encoding expresses a value using different format than standard binary representation. To illustrate, if you have a number whose standard binary representation is 0111, it also can be expressed as 100$\bar{1}$, where $\bar{1}$ denotes the digit −1. That is, the decimal value of 0111 is 7, which is equal to 100$\bar{1}$ (i.e., $1 \times 2^3 + 0 \times 2^2 + 0 \times 2^1 + (-1) \times 2^0 = 8+0+0+(-1) = 7$). This reduces the reduce the number of "1"s in the binary representation of a number, thereby reducing the number of operands to be added together and reducing the hardware cost of an adder network. When a coefficient has more than 3 consecutive "1"s in its standard binary representation, efficiency can be gained by application of Booth encoding to translate the coefficient from standard binary representation into a different representation such as sign-digit representation. So (11) can be rewritten based on modified Booth encoding as $$\begin{bmatrix} \cos4\theta \\ \cos2\theta \\ \cos6\theta \end{bmatrix} = \begin{bmatrix} 0.707106781 \\ 0.923879532 \\ 0.382683432 \end{bmatrix} = \begin{bmatrix} 0.1011 & 0101 & 0000 & 0101 \\ 1.000\bar{1} & 0\bar{1}00 & 1000 & 0011 \\ 0.10\bar{1}0 & 0010 & 0000 & \bar{1}000 \end{bmatrix}$$

$$\begin{bmatrix} \cos1\theta \\ \cos3\theta \\ \cos7\theta \\ \cos5\theta \end{bmatrix} = \begin{bmatrix} 0.98078528 \\ 0.831469612 \\ 0.195090322 \\ 0.555570233 \end{bmatrix} = \begin{bmatrix} 1.0000 & 0\bar{1}0\bar{1} & 0001 & 0101 \\ 1.0\bar{1}01 & 0101 & 00\bar{1}0 & 0\bar{1}0\bar{1} \\ 0.010\bar{1} & 0010 & 000\bar{1} & 0001 \\ 0.1001 & 00\bar{1}0 & 0100 & \bar{1}010 \end{bmatrix} \quad (12)$$

Using the binary form of the IDCT cosine coefficients in (12), we can exploit the adder-based design approach to write the inner products in the IDCT computation as a series of additions and accumulations, based on equations (9) and (10).

Figure 2B:
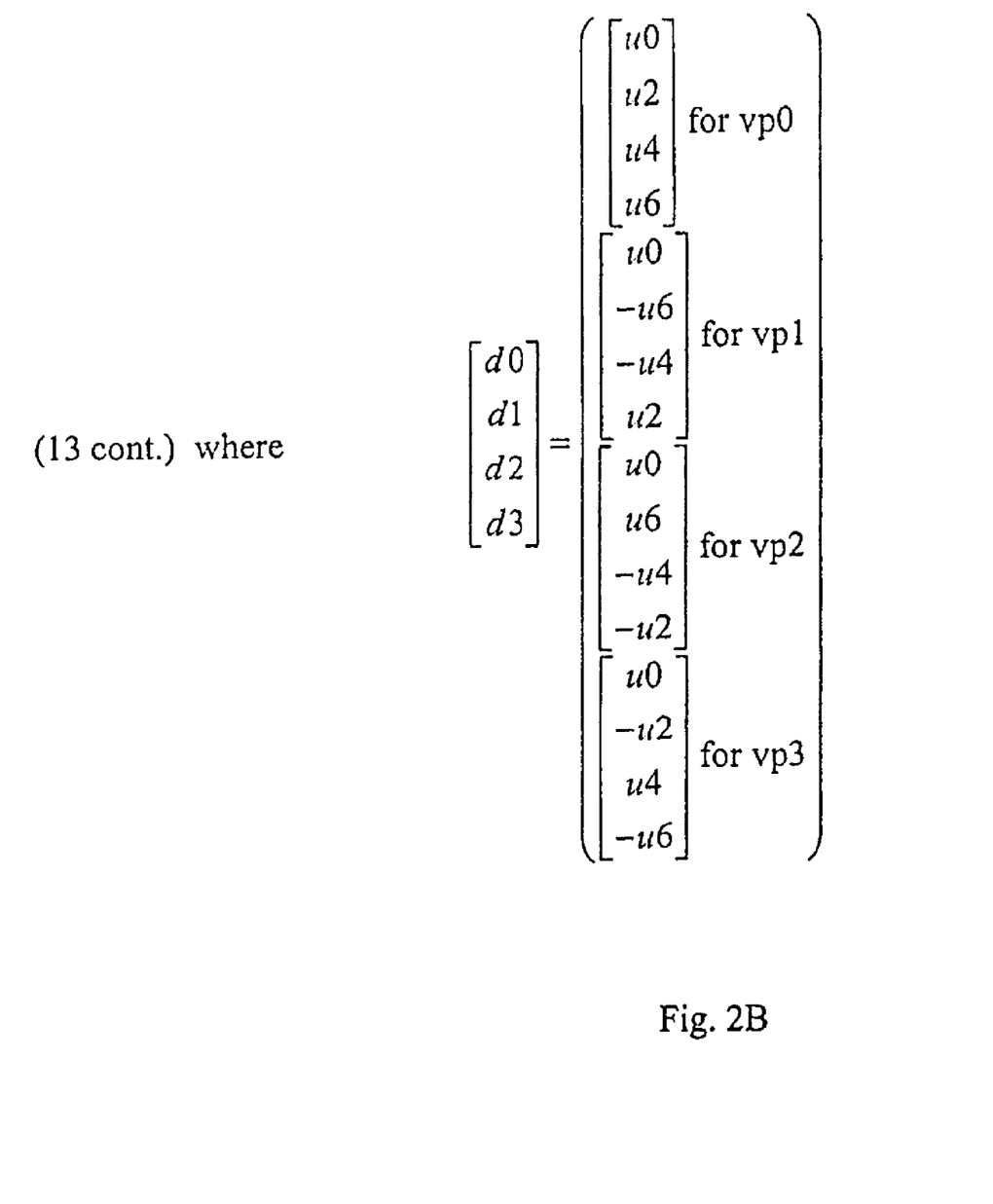

The IDCT output data set v preferably is processed as $v_p$ and $v_n$. From equation (9), we see that the coefficients for calculation of elements of the vector $v_p$ are practically the same, so it is enough to consider the hardware circuit realization of a single element of the vector such as $v_{p0}$. The computation of the output element $v_{p0}$ can be expressed as shown in FIGS. 2A and 2B. In FIG. 2A, the calculation takes into account each of the coefficients that appear in equation (9), using the encoded representation of equations (12). Equation (13) shows how intermediate sums need to be accumulated to calculate $v_{p0}$. The input permutations of FIG. 2B, are used for calculation of $v_{p0}$ . . . $v_{p3}$. The generality of equation (13) shows that one adder network can capture all of the coefficients need to calculate the vector $v_p$, requiring only permutation or preadding of input data values that accepted in parallel by the adder network to calculate the required inner products.

To further simplify equation (13) of FIGS. 2AS & 2B, let $X = d0+d2$. For $v_{p0}$, equation (13) becomes $$vp0 = d1 + (X+d3)\cdot2^{-1} + (X-d3)\cdot2^{-3} + \quad (14)$$
$$(X-d1)\cdot2^{-4} + (X-d1)\cdot2^{-6} + d3\cdot2^{-7} + X\cdot2^{-8} +$$
$$d1\cdot2^{-9} + (-d3)\cdot2^{-13} + X\cdot2^{-14} + d1\cdot2^{-15} + (X+d1)\cdot2^{-16}$$

The present invention includes an adder network that accumulates this sum or a sum that is essentially the same. The present invention can use IDCT coefficients that are factored or encoded differently than in equation (14). In a preferred embodiment of the present invention, 16-bit input values are segmented into least and most significant digits and accumulated in two parts, being combined after the two parts have been separately summed.

Figure 3B:
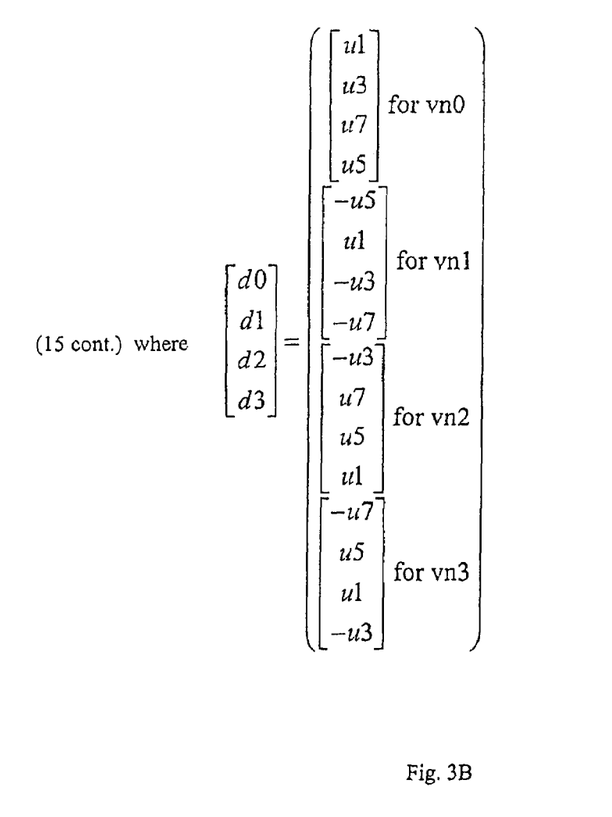
Figure 3C:
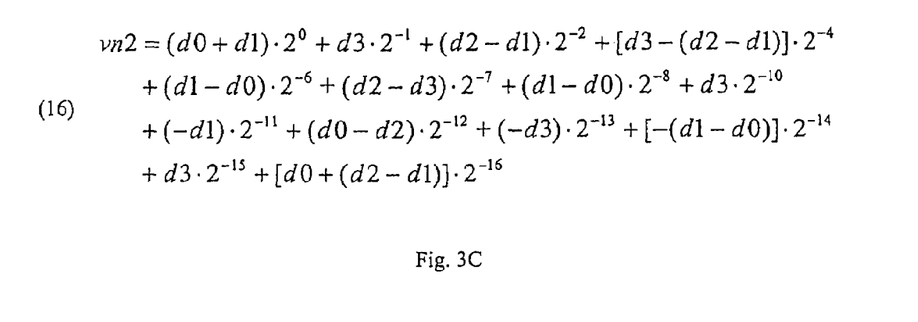

FIGS. 3A, 3B and 3C illustrate the same approach to accumulating the values of elements of $v_n$ is applied above to $v_p$. Again, an embodiment of the present invention is an adder network that accumulates the sum in equation (16) of FIG. 3C or a sum that is essentially the same. The present invention extends to both IDCT and DCT transforms.

For a 1-D 8-point DCT, the matrix representation has been shown in equations (5) and (6) to be the following:

$$Ue = \begin{bmatrix} u0 \\ u2 \\ u4 \\ u6 \end{bmatrix} = \begin{bmatrix} \cos4\theta & \cos4\theta & \cos4\theta & \cos4\theta \\ \cos2\theta & \cos6\theta & \cos10\theta & \cos14\theta \\ \cos4\theta & \cos12\theta & \cos20\theta & \cos28\theta \\ \cos6\theta & \cos18\theta & \cos30\theta & \cos42\theta \end{bmatrix} \cdot \begin{bmatrix} vp0 \\ vp1 \\ vp2 \\ vp3 \end{bmatrix} = [Ce]\cdot[vp] \quad (17)$$

$$Uo = \begin{bmatrix} u1 \\ u3 \\ u5 \\ u7 \end{bmatrix} = \begin{bmatrix} \cos1\theta & \cos3\theta & \cos5\theta & \cos7\theta \\ \cos3\theta & \cos9\theta & \cos15\theta & \cos21\theta \\ \cos5\theta & \cos15\theta & \cos25\theta & \cos35\theta \\ \cos7\theta & \cos21\theta & \cos35\theta & \cos49\theta \end{bmatrix} \cdot \begin{bmatrix} vn0 \\ vn1 \\ vn2 \\ vn3 \end{bmatrix} = [Co]\cdot[vn] \quad (18)$$

where $$[vp] = \begin{bmatrix} vp0 \\ vp1 \\ vp2 \\ vp3 \end{bmatrix} = \begin{bmatrix} v0+v7 \\ v1+v6 \\ v2+v5 \\ v3+v4 \end{bmatrix}; \text{ and } [vn] = \begin{bmatrix} vn0 \\ vn1 \\ vn2 \\ vn3 \end{bmatrix} = \begin{bmatrix} v0-v7 \\ v1-v6 \\ v2-v5 \\ v3-v4 \end{bmatrix};$$

$$[Ce] = \begin{bmatrix} \cos4\theta & \cos4\theta & \cos4\theta & \cos4\theta \\ \cos2\theta & \cos6\theta & \cos10\theta & \cos14\theta \\ \cos4\theta & \cos12\theta & \cos20\theta & \cos28\theta \\ \cos6\theta & \cos18\theta & \cos30\theta & \cos42\theta \end{bmatrix};$$

$$[Co] = \begin{bmatrix} \cos1\theta & \cos3\theta & \cos5\theta & \cos7\theta \\ \cos3\theta & \cos9\theta & \cos15\theta & \cos21\theta \\ \cos5\theta & \cos15\theta & \cos25\theta & \cos35\theta \\ \cos7\theta & \cos21\theta & \cos35\theta & \cos49\theta \end{bmatrix}; \text{ and } \theta = \pi/16.$$

Simplifying the cosine coefficients based on their periodic nature and permuting some of the elements of the vector $v_n$, we can rewrite the DCT equations (17) and (18) in essentially the same form as the IDCT equations. That is, $$[Ue] = \begin{bmatrix} u0 \\ u2 \\ u4 \\ u6 \end{bmatrix} = \begin{bmatrix} \cos4\theta & \cos4\theta & \cos4\theta & \cos4\theta \\ \cos2\theta & \cos6\theta & -\cos6\theta & -\cos2\theta \\ \cos4\theta & -\cos4\theta & -\cos4\theta & \cos4\theta \\ \cos6\theta & -\cos2\theta & \cos2\theta & -\cos6\theta \end{bmatrix} \cdot \begin{bmatrix} vp0 \\ vp1 \\ vp2 \\ vp3 \end{bmatrix} \quad (19)$$

$$[Uo] = \begin{bmatrix} u1 \\ u3 \\ u5 \\ u7 \end{bmatrix} = \begin{bmatrix} \cos1\theta & \cos3\theta & \cos5\theta & \cos7\theta \\ \cos3\theta & -\cos7\theta & -\cos1\theta & -\cos5\theta \\ \cos5\theta & -\cos1\theta & \cos7\theta & \cos3\theta \\ \cos7\theta & -\cos5\theta & \cos3\theta & -\cos1\theta \end{bmatrix} \cdot \begin{bmatrix} vn0 \\ vn1 \\ vn2 \\ vn3 \end{bmatrix} \quad (20)$$

$$= \begin{bmatrix} u3 \\ u7 \\ u5 \\ u1 \end{bmatrix} = \begin{bmatrix} -\cos1\theta & \cos3\theta & -\cos7\theta & -\cos5\theta \\ \cos3\theta & \cos7\theta & -\cos5\theta & -\cos1\theta \\ \cos7\theta & \cos5\theta & -\cos1\theta & \cos3\theta \\ \cos5\theta & \cos1\theta & \cos3\theta & \cos7\theta \end{bmatrix} \cdot \begin{bmatrix} vn2 \\ vn0 \\ vn1 \\ vn3 \end{bmatrix}$$

For purposes of implementing these coefficients in one or more adder networks, it is useful to subdivide [Ue] and to rewrite these equations with one row of coefficients.

$$\begin{bmatrix} u0 \\ u4 \end{bmatrix} = \begin{bmatrix} \cos4\theta & \cos4\theta & \cos4\theta & \cos4\theta \\ \cos4\theta & -\cos4\theta & -\cos4\theta & \cos4\theta \end{bmatrix} \cdot \begin{bmatrix} vp0 \\ vp1 \\ vp2 \\ vp3 \end{bmatrix}$$

-continued $$[u0 \quad u4] = [\cos4\theta \quad \cos4\theta \quad \cos4\theta \quad \cos4\theta] \cdot \begin{bmatrix} vp0 & vp0 \\ vp1 & -vp1 \\ vp2 & -vp2 \\ vp3 & vp3 \end{bmatrix}$$

$$\begin{bmatrix} u2 \\ u6 \end{bmatrix} = \begin{bmatrix} \cos2\theta & \cos6\theta & -\cos6\theta & -\cos2\theta \\ \cos6\theta & -\cos2\theta & \cos2\theta & -\cos6\theta \end{bmatrix} \cdot \begin{bmatrix} vp0 \\ vp1 \\ vp2 \\ vp3 \end{bmatrix} \quad (21)$$

$$[u2 \quad u6] = [\cos2\theta \quad \cos6\theta \quad \cos2\theta \quad \cos6\theta] \cdot \begin{bmatrix} vp0 & vp2 \\ vp1 & vp0 \\ -vp3 & -vp1 \\ -vp2 & -vp3 \end{bmatrix} \text{ and}$$

$$[u3 \quad u7 \quad u5 \quad u1] = \qquad (22)$$

$$[\cos1\theta \quad \cos3\theta \quad \cos7\theta \quad \cos5\theta] \cdot \begin{bmatrix} -vn2 & -vn3 & -vn1 & vn0 \\ vn0 & vn2 & vn3 & vn1 \\ -vn1 & vn0 & vn2 & vn3 \\ -vn3 & -vn1 & vn0 & vn2 \end{bmatrix}$$

The output data set u preferably is processed as $u_o$ and $u_e$. The coefficients to produce $u_o$ in DCT equation (22) are the same as the coefficients in the IDCT equation (10), which implies that one of the same adder networks used for IDCT calculation can be used for DCT calculation of the vector $u_o$, needing only to change how the input data values are combined before they reach the adder network. For the values of the vector d in equation (13) of FIG. 2B, the following combination of input data values can be used to implement equation (22).

$$\begin{bmatrix} d0 \\ d1 \\ d2 \\ d3 \end{bmatrix} = \begin{pmatrix} \begin{bmatrix} -vn2 \\ vn0 \\ -vn1 \\ -vn3 \end{bmatrix} \text{ for } u3 \\ \begin{bmatrix} -vn3 \\ vn2 \\ vn0 \\ -vn1 \end{bmatrix} \text{ for } u7 \\ \begin{bmatrix} -vn1 \\ vn3 \\ vn2 \\ vn0 \end{bmatrix} \text{ for } u5 \\ \begin{bmatrix} vn0 \\ vn1 \\ vn3 \\ vn2 \end{bmatrix} \text{ for } u1 \end{pmatrix} \quad (23)$$

The adder networks to implement DCT equation (21) differ from the networks to implement the IDCT equations, as different cosine coefficients appear. As in equation (21), it is useful to sudivide calculation of the vector $u_o$. For purposes of implementing an adder network, the u0 and u4 elements of the output data set can be calculated as $$[u_{0 \text{ or } 4}] = [\cos4\theta \quad \cos4\theta \quad \cos4\theta \quad \cos4\theta] \cdot \begin{bmatrix} d0 \\ d1 \\ d2 \\ d3 \end{bmatrix} \text{ where} \quad (23)$$

$$\begin{bmatrix} d0 \\ d1 \\ d2 \\ d3 \end{bmatrix} = \begin{pmatrix} \begin{bmatrix} vp0 \\ vp1 \\ vp2 \\ vp3 \end{bmatrix} \text{ for } u0 \\ \begin{bmatrix} vp0 \\ -vp1 \\ -vp2 \\ vp3 \end{bmatrix} \text{ for } u4 \end{pmatrix}$$

Alternatively, u0 and u4 can be expressed as $$u0 \text{ or } u4 = \cos4\theta \cdot (d0 + d1 + d2 + d3) \quad (24)$$

$$= 0.1011 \ 0101 \ 0000 \ 0101 \times (d0 + d1 + d2 + d3)$$

$$= [2^{-1} + 2^{-3} + 2^{-4} + 2^{-6} + 2^{-8} + 2^{-14} + 2^{-16}] \times$$

$$(d0 + d1 + d2 + d3)$$

The manner in which the input data values are combined determines whether an adder network implementing these cosine coefficients produces u0 or u4 as an output data value. The calculation of u2 and u6 is similar, based on the following $$u2 \text{ or } u6 = \cos2\theta \cdot (d0 + d2) + \cos6\theta \cdot (d1 + d3) \quad (25)$$

$$= 1.000\overline{1} \ 0\overline{1}00 \ 1000 \ 010\overline{1} \times (d0 + d2) +$$

$$0.1 0\overline{1}0 \ 0010 \ 0000 \ \overline{1}000 \times (d1 + d3) +$$

$$= (d0 + d2) \times 2^0 + (d1 + d3) \times 2^{-1} + [-(d1 + d3)] \times 2^{-3} +$$

$$[-(d0 + d2)] \times 2^{-4} + [-(d0 + d2)] \times 2^{-6} + (d1 + d3) \times$$

$$2^{-7} + (d0 + d2) \times 2^{-9} + [-(d1 + d3)] \times 2^{-13} + (d0 + d2) \times$$

$$2^{-14} + [-(d0 + d2)] \times 2^{-16}$$

$$\text{where } \begin{bmatrix} d0 \\ d1 \\ d2 \\ d3 \end{bmatrix} = \begin{pmatrix} \begin{bmatrix} vp0 \\ vp1 \\ -vp3 \\ -vp2 \end{bmatrix} \text{ for } u2 \\ \begin{bmatrix} vp2 \\ vp0 \\ -vp1 \\ -vp3 \end{bmatrix} \text{ for } u6 \end{pmatrix}.$$

Figure 4:
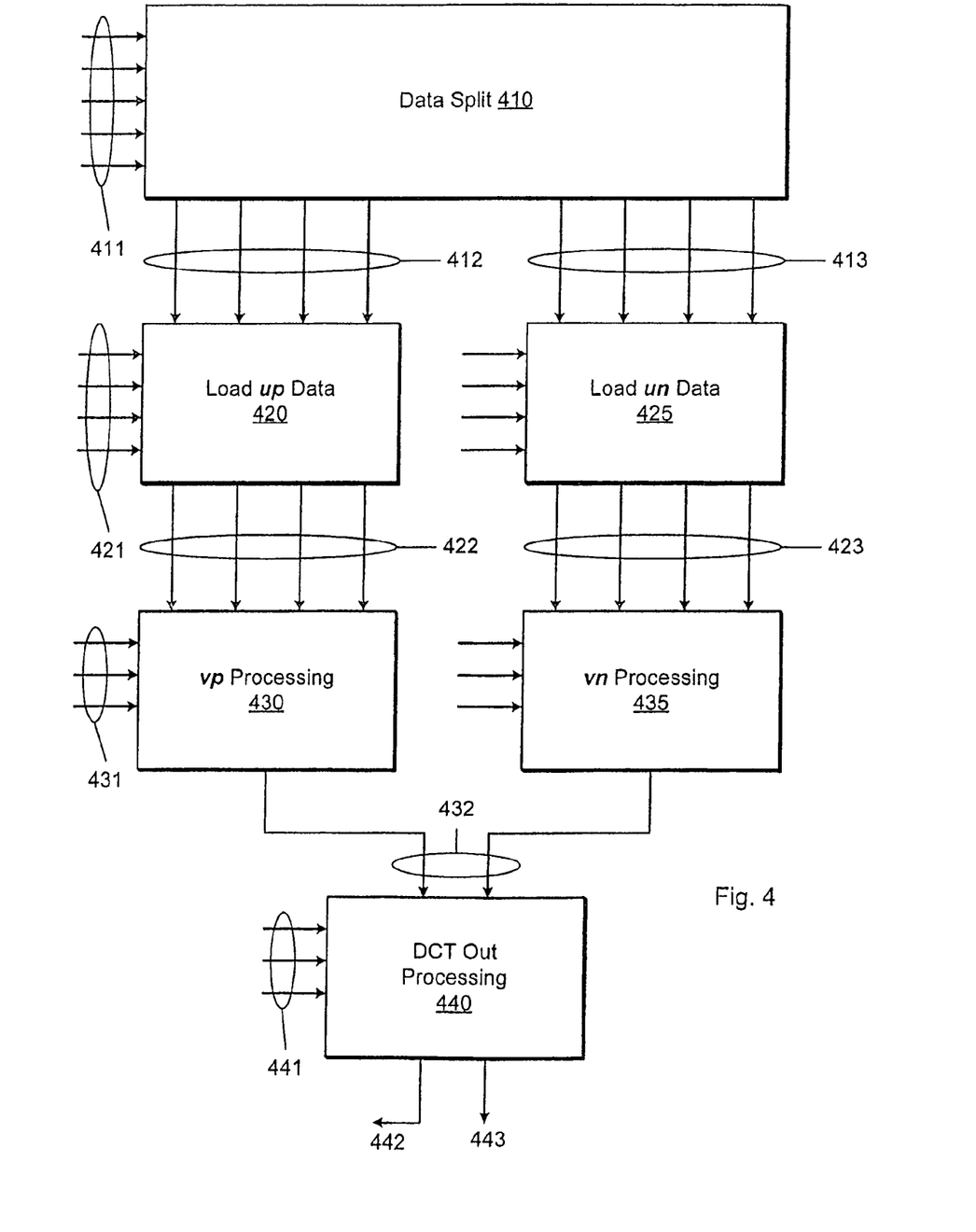
FIG. 4 illustrates an embodiment of the present invention, in block diagram format.

FIG. 4 illustrates a preferred embodiment of the present invention for a two-dimensional IDCT transform. Sets of input data values are received sequentially and summed in parallel. The block labeled data split 410 includes sequential-in-parallel-out registers. There are five lines 411 into data split 410. The first input line 411 is a 12 bit precision input data value for data to be transformed. Successive data values constitute a set. In one preferred embodiment, a set of input data values consists of eight values, u0 ... u7. Successive sets of data constitute an 8 by 8 matrix of values. In an alternative embodiment, a set of input data values would consist of 16 values and successive sets of input data would constitute a 16 by 16 matrix of values. Data split 410 presents successive sets of input data values one set at a time. The second input line 411 is a 15 bit precision input data value for data that is being transformed a second time, to realize a two-dimensional IDCT. The third control line 411 is connected to a state machine which is not illustrated. This control line indicates whether the data passing through the data split circuit 410 is a set of unprocessed input data values or data that has already been processed through a one-dimensional IDCT transform. The fourth control line 411 is a wait control signal from the state machine which can be used to suspend the operation of the IDCT calculation. The fifth control line 411 is connected to a system clock. The data split circuit 410 includes logic to partition serial input data values to produce the parallel output vectors $u_e$ and $u_o$, essentially as shown in equations (7) and (8). There are eight output lines, labeled 412 and 413. The four output lines 412 coupled to the block load $u_p$ data 420 carry the even indexed data values u6, u4, u2 and u0. These are 15 bit precision data values. Similarly, the four output lines 413 coupled to the load $u_n$ data block 425 carry the odd indexed values of an input data set.

The blocks labeled load $u_p$ data 420 and the load $u_n$ data 425 include buffer registers. Input lines 412 and 413 carry 15 bit precision data values. Load up data 420 includes logic to combine inputs u6, u4, u2 and u0 received on lines 412 into operands d0, d1, d2, and d3 which are output on lines 422 essentially as shown in equation (13) of FIG. 2A & FIG. 2B. There are four control inputs 421 to load $u_p$ data 420. The first control input in this preferred embodiment is a wait control signal from a state machine which can be used to suspend the operation of the IDCT calculation. The second control input is a select signal from a state machine which controls the mapping between input data values 412 and output data values 422. The third control input indicates whether the data passing through this block is a set of unprocessed input data values or data that has already been transformed once. The fourth control input is connected to the system clock.

The input data values, input control signals and output operands for load $u_n$ data 425 are essentially the same as for 420. The difference between load $u_p$ data and load $u_n$ data in this preferred embodiment is essentially as in equations (13) and (15).

$V_p$ processing 430, includes a adder network that accepts operands in parallel and accomplishes pair of the multiplication in equation (13). In a preferred embodiment, the coefficient submatrix by which the operands are multiplied is embodied in the routing of bits of the operands to adders in the networks. Networks of carry save adders and adders, preferably ending in a carry propagate adder, execute additions and accumulations by parallel processing, to calculate the product of a vector and a coefficient submatrix. The operands accepted in parallel 422 are d0, d1, d2, and d3 in equation (13) of FIG. 2A & FIG. 2B. The output data value for these operands, which is one of two lines 432 coupled to DCT out processing 440. There are three control inputs 431 to $v_p$ processing 430. The first control input to this preferred embodiment is a wait control signal from a state machine which can be used to suspend the operation of the IDCT calculation. The second control input indicates whether the data passing through this block of the circuit is a set of unprocessed input data values or data that has already been transformed once. The third control input is connected to the system clock.

The input operands, input control signals and output data values for $v_n$ processing 435 are essentially the same as for $v_p$ processing 430. The difference between the $v_n$ processing and $v_p$ processing blocks is essentially as in equations (13) and (15).

Taken together, the data split 410, the load data blocks 420 and 425, and the vector processing 430 and 435 include input lines, logic to present successive sets of input data values one set at a time, adder networks which accept input data values in parallel, and output lines.

The DCT out processing 440 performs the data rearrangement that is needed for the next stage of processing. Because a two-dimensional IDCT is computed in the preferred embodiment, there are two alternative next stages at 440. For either next stage, the DCT out processing 440 combine the values from $v_n$ processing and $v_p$ processing to generate the a series of output data sets also referred to as vectors v, essentially as in equations (13) and (15). Then, the DCT out processing alternatively transposes the sets of output data values for a matrix of output data sets or it rounds and outputs the sets of data values. In the first alternative, the sets of output data values are transposed so that they can be processed a second time to accomplish a two-dimensional IDCT transform. This logic to transpose is coupled back to the input lines.

In an alternative embodiment for performing DCT transforms, instead of IDCT transforms, the structure of the present invention varies somewhat from FIG. 4. The principal difference, apparent to one of skill in the art from the equations above, is that vectors of FIG. 2A & FIG. 2B and $v_n$ are created from a set of input data values before processing through the adder network for a DCT transform, whereas they are combined to create a set of output data values after processing through the adder network for an IDCT transform. The transform matricies are similar, being $$[u] = \begin{bmatrix} u_e \\ u_o \end{bmatrix} = \begin{bmatrix} C_e & 0 \\ 0 & C_o \end{bmatrix} \cdot \begin{bmatrix} v_p \\ v_n \end{bmatrix}$$

for a DCT transform and $$\begin{bmatrix} v_p \\ v_n \end{bmatrix} = \begin{bmatrix} C_e^T & 0 \\ 0 & C_o^T \end{bmatrix} \cdot \begin{bmatrix} u_e \\ u_o \end{bmatrix}$$

for an IDCT transform. In both embodiments, processing of a two dimensional transform requires data transposition and further processing through adder networks.

In a further alternative embodiment, the second dimension of processing could be accomplished by repeating much of the logic in FIG. 4, instead of routing the data through a first adder networks twice. In other words, there would be a second data split 410', second load data blocks 420' and 425', and second vector processing 430' and 435', all of which would be repeated after the DCT out processing 440. The DCT out processing 440 would transpose data sets and to the input lines to a second data split. A second DCT out processing 440' including output logic would be coupled after the second adder networks. Thus, in this alternative embodiment, the logic of the DCT out processing 440 described above would be divided between two DCT out processing blocks, 440 and 440'.

Figure 5:
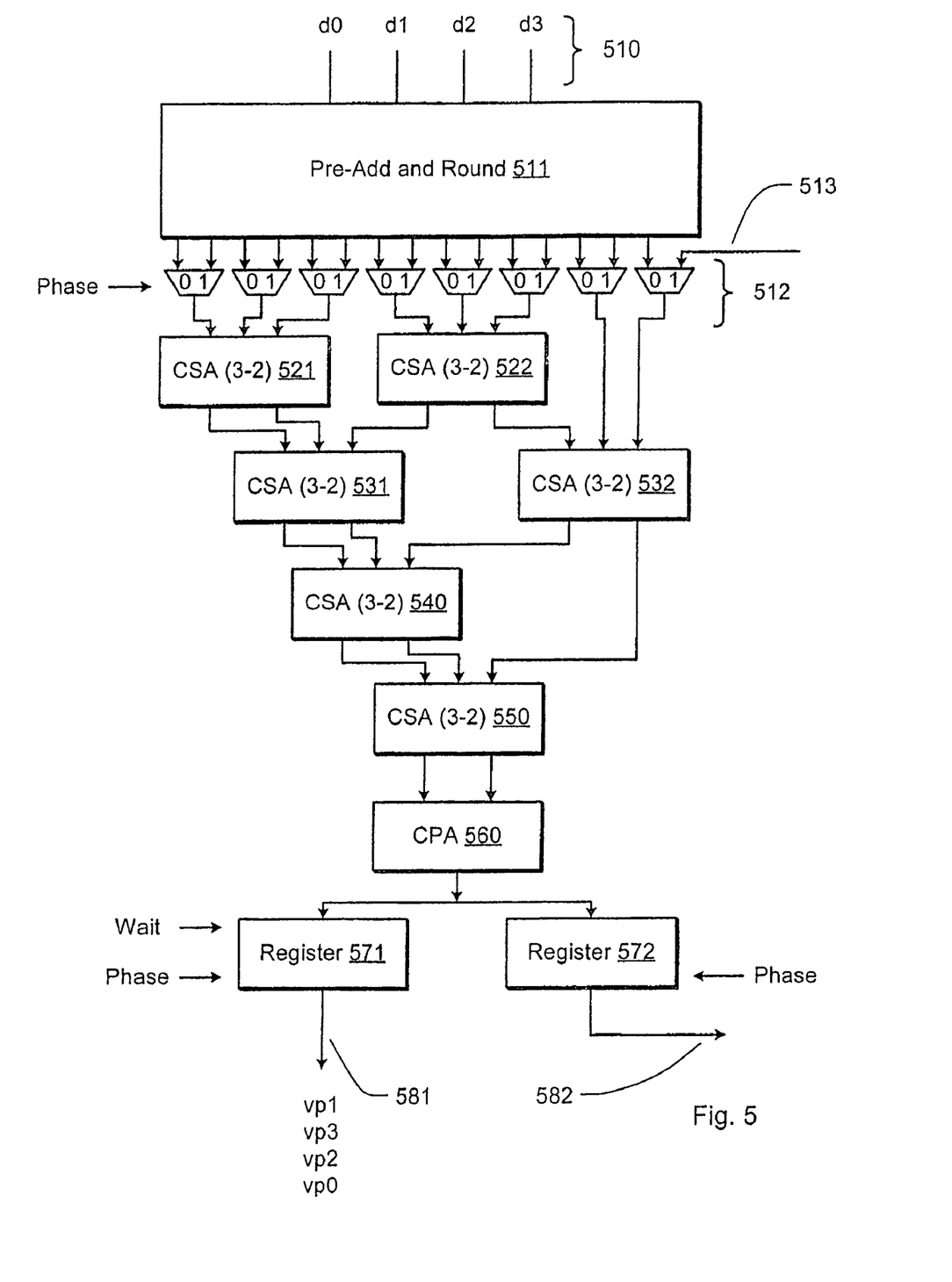
FIG. 5 provides additional detail of an adder network portion of the present invention.

FIG. 5 provides additional conceptual detail regarding vector processing, either 430 or 435. In a preferred embodiment, pre-add and round logic 511 receives operands 510. The pre-add and round unit 511 handles bit shifting to scale the operands before they are processed by the parallel adder network. In successive phases, controlled by the phase signal associated with 512, pre-added and rounded operands are routed to the adder network. Fifteen operands, for instance, are passed to the adder network as two sets of operands. The muxes 512 determine whether the first set of eight operands or the second set of seven operands, combined with the result of summing the first eight operands, are supplied to the adder network. In one preferred embodiment, the adder network includes four layers of carry save adders, sometimes otherwise referred to as full adders, which are illustrated in FIG. 5. As these carry save adders are full adders, each operand is full-length after scaling. Each of these carry save adders accepts three inputs and generates two outputs. When an IDCT transform is calculated by $v_p$ processing of fifteen operands, on the first pass through eight operands are combined through muxes 512. The result is stored in register 572 and is passed to the parallel adder network through the muxes 512 via lines 582 and 513. On the second pass through, seven operands plus the result in register 572 are combined through muxes 512. The result of the second pass through is stored in register 571 and available on line 581.

The operation of CSA 522 is understood by reference to the following example.

```
                     X3  X2  X1  X0
                     Y3  Y2  Y1  Y0
        Operation of +Z3  Z2  Z1  Z0
        CSA (3-2 adder)  S3  S2  S1  S0
                     C3  C2  C1  C0
``` where X, Y and Z are input operands and 3 . . . 0 indicate the relative significance of bits of the input operands. S0 is the result of ((X0 xor Y0) xor Z0) or an equivalent operation. C0 is the carry, if the majority of X0, Y0 and Z0 are "1"s. An advantage of a CSA with two outputs over other adders, such as carry propagate adders (CPA), is that all of the bits in operands X, Y and Z are added in parallel, without waiting for the sums of less significant bits to propagate to more significant bits. CSA 522 operates in this fashion: the output of 522 includes a save (as S0) and a carry (as C0) which may be the sum of the scaled operands (d0–d2), (–d3), and (–(d1–d0)).

One of the outputs of CSA 522 is routed to CSA 531 and the other to CSA 532. The routing in a preferred embodiment through four levels of CSAs is dictated by limiting each CSA to three inputs. The depth of this adder network is determined by how many levels of adders are required to combine the pre-added and rounded operands. At the bottom of the adder network is an adder that produces a single output from two inputs. In a preferred embodiment, this adder is a carry propagate adder.

Coupled to CPA 560 are registers 571 and 572. In the first phase of accumulation (phase equal 0), the sum of eight operands is stored in register 572. The value in this register is output on line 582, which is connected to line 513, an input to CSA 532. In the second phase of accumulation (phase equal 1), the remaining operands are combined with the value in register 572 as input to the parallel adder network. The final summation of these operands is accomplished by CPA 560, which stores the result in register 571. In a preferred embodiment of the present invention, only two clock cycles are needed to accumulate as many as fifteen operands that have been pre-added and rounded. In effect, in two clock cycles, a set of pre-added and rounded input values has been multiplied by the coefficients in a row of an IDCT transform matrix and summed. By efficient matrix factoring and use of an adder network which accomplishes processing in parallel, both the time and the hardware cost for performing an IDCT transform are reduced.

FIG. 6 illustrates a method and apparatus for accepting eight inputs in serial and outputting them in parallel, as performed in block 410 of FIG. 4. The first input line 411 corresponds to the input From INVQ to MUX 601, providing data input from an inverse-quantizer. The second input line 411 corresponds to input From TRAM to MUX 601. Input From TRAM is used to accomplish a 2-D IDCT in two passes through a 1-D IDCT calculator. TRAM is a temporary buffer that stores the result of the first-pass 1-D IDCT. The third control line 411 corresponds to control signal S_ID_R. The fourth control line 411 corresponds to the wait signal to register 602. The fifth control signal 411 is a clock signal which is omitted here. The P_RST reset signal is used to reset register 602. Data value are received through MUX 601 and passed sequentially from register to register 603, taking eight clock cycles to receive eight data values for parallel output.

FIGS. 7 and 8 illustrate the permutation of data from inputs to produce a vector d0 . . . d3 for each of the vectors vp0 . . . vp3 and vn0 . . . vn3 according to FIGS. 2B and 3B. FIG. 7 illustrates the permutation engine for sequentially generating vp0, vp2, vp3 and vp1. According to FIG. 2B, the vector d0 . . . d3 for vp0 is simply u0, u2, u4, u6. When the signal S=1 is received by MUXes 711–714, the input values from FIG. 6 are loaded, producing vp0. In subsequent passes, S=0 and the input values are permuted and sometimes twos-complemented. To produce vp2 in the second pass, the permutation engine uses the value D2 in register 723. It twos-complements this value and passes it through MUX 711 to register 721. Similarly, in the second pass, the value D4 in register 722 is twos-complemented and passed through MUX 712 to register 721. This permutation engine produces vp1 from vp3 from vp2 from vp0, in turn. In four passes, the vectors corresponding to vp0 . . . vp3 are generated. To further explain FIG. 7, it should be clear that 701 is the logic for generating the control signal S, used to control MUXes 711–714 from the input control signals 702. The inputs u0 . . . u6 are 15 bit values. The registers 721–724 are clocked by the signal CLK. the group of registers can be reset responsive to the signal P_RST. FIG. 8 illustrates the permutation engine for vn0 . . . vn3 according to FIG. 3B. In this engine, only one input needs to be two-complemented with each permutation of inputs.

FIGS. 9 and 10 further explain the two-pass operation of the adder network in FIG. 5. Referring to FIG. 9, in a first pass, a preadder for $v_p$ processing produces the intermediate values x, y, z and d3B. At the same time, an adder network as illustrated in FIG. 5 processes the boxed coefficients. In a second pass, the intermediate values replace the non-boxed coefficients and are combined with the result of the first pass in the adder network. Similarly, for FIG. 10, in the first pass a preadder for $v_n$ processing produces the intermediate values w, x, y, z, zz and d3B. To reduce the number of operands processed by the adder network in the second pass, the preadder combines two coefficients, $D3*2^{-10}-D1*2^{-11}$, as $zz=(D3-(½)D1)*2^{-10}$. At the same time, an adder network as illustrated in FIG. 5 processes the eight boxed coefficients for $2^0 \ldots 2^4$. In a second pass, the intermediate values replace the non-boxed coefficients and are combined with the result of the first pass in the adder network.

The forgoing description of the preferred embodiment of the invention has been presented for purposes of illustration and description. The description is not intended to be exhaustive or to limit the invention to the precise form disclosed. Obviously, many modifications and variations will be apparent to practitioners skilled in this art. It is intended that the scope of the invention be defined by the following claims and their equivalents.

What is claimed is:

1. A method for partially carrying out a discrete cosine transform (DCT) on a set of input data values $v_i$ based on a coefficient matrix essentially as follows $$[u] = \begin{bmatrix} C_e & 0 \\ 0 & C_o \end{bmatrix} * \begin{bmatrix} vp \\ vn \end{bmatrix},$$

where u is a set of output data values, $C_e$ and $C_o$ are coefficient sub-matrices, vp is a vector of sums of input data values, and vn is a vector of differences of input data values, including:

generating from the input data values the vectors vp and vn are generally of the forms $$[vp] = \begin{bmatrix} vp0 \\ vp1 \\ vp2 \\ vp3 \end{bmatrix} = \begin{bmatrix} v0+v7 \\ v1+v6 \\ v2+v5 \\ v3+v4 \end{bmatrix}$$

and $$[vn] = \begin{bmatrix} vn0 \\ vn1 \\ vn2 \\ vn3 \end{bmatrix} = \begin{bmatrix} v0-v7 \\ v1-v6 \\ v2-v5 \\ v3-v4 \end{bmatrix};$$

iteratively submitting permutations of the vectors vp and vn to first and second adder networks that implement multiplication of the vectors by coefficients common to rows of the sub-matrices $C_e$ and $C_o$, respectively; and assembling the set of output data values u from results of the iterative submission of the permutations of the vectors to the adder networks.

2. The method of claim 1, further including, in the adder networks, adding the permutations of the vectors through multiple layers of adders interconnected to produce intermediate sums and carries and accumulating the intermediate sums and carries to produce one element of the set of output data values.

3. The method of claim 2, wherein the adder networks produce the sums and carries through the multiple layers of adders as combinational results.

4. The method of claim 2, wherein the interconnections among the multiple layers of adders implement the multiplication of the vectors by the coefficients of sub-matrices.

5. Implementing a 2-D DCT utilizing the method of claim 2, further including passing transposed sets of the output data values from a first pass through the adder networks back through the same adder networks a second time.

6. A method for partially carrying out an inverse discrete cosine transform (IDCT) on a set of transformed data values $u_i$ based on a coefficient matrix essentially as follows $$\begin{bmatrix} vp \\ vn \end{bmatrix} = \begin{bmatrix} C_e^T & 0 \\ 0 & C_o^T \end{bmatrix} * \begin{bmatrix} u_e \\ u_o \end{bmatrix},$$

where $u_e$ and $u_e$ are even and odd indexed values of the set of transformed data, $C_e^T$ and $C_o^T$ are coefficient sub-matrices for inverse transformation, vp is a vector of sums of inverse transformed data, and vn is a vector of differences of inverse transformed data, including:

iteratively submitting permutations of the transformed data values $u_e$ and $u_e$ to first and second adder networks that implement multiplication of the transformed data values by coefficients common to rows of the sub-matrices $C_e^T$ and $C_o^T$, respectively;

generating the inverse transformed data values $v_i$ from the vectors vp and vn produced by the iterative submission of the permutations of the transformed data values to the adder networks, where the vectors vp and vn are generally of the forms $$[vp] = \begin{bmatrix} vp0 \\ vp1 \\ vp2 \\ vp3 \end{bmatrix} = \begin{bmatrix} v0+v7 \\ v1+v6 \\ v2+v5 \\ v3+v4 \end{bmatrix}$$

and $$[vn] = \begin{bmatrix} vn0 \\ vn1 \\ vn2 \\ vn3 \end{bmatrix} = \begin{bmatrix} v0-v7 \\ v1-v6 \\ v2-v5 \\ v3-v4 \end{bmatrix};$$

and assembling the set of inverse transformed data values vi.

7. The method of claim 6, further including, in the adder networks, adding the permutations of the vectors through multiple layers of adders interconnected to produce intermediate sums and carries and accumulating the intermediate sums and carries to produce one element of the set of output data values.

8. The method of claim 7, wherein the adder networks produce the sums and carries through the multiple layers of adders as combinational results.

9. The method of claim 7, wherein the interconnections among the multiple layers of adders implement the multiplication of the vectors by the coefficients of sub-matrices.

10. Implementing a 2-D IDCT utilizing the method of claim 6, further including passing transposed sets of the output data values from a first pass through the adder networks back through the same adder networks a second time.

* * * * *